T. R. BROWN.
CAR AND ELECTRIC COUPLING CONTROL.
APPLICATION FILED APR. 10, 1914.
1,269,253.
Patented June 11, 1918.
3 SHEETS—SHEET 3.
-FIG. 6.-
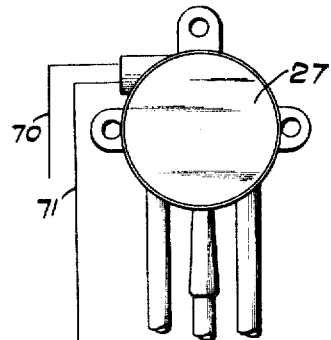
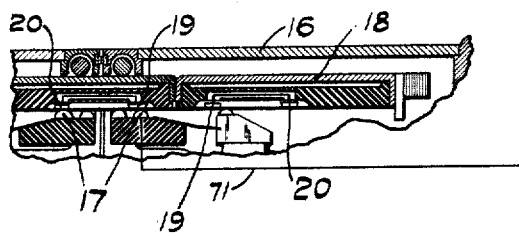
-FIG. 7.-
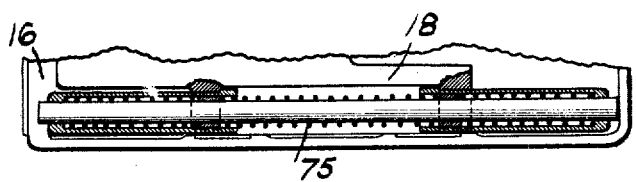
INVENTOR
Thomas R. Brown
by Edward Wright
Atty.

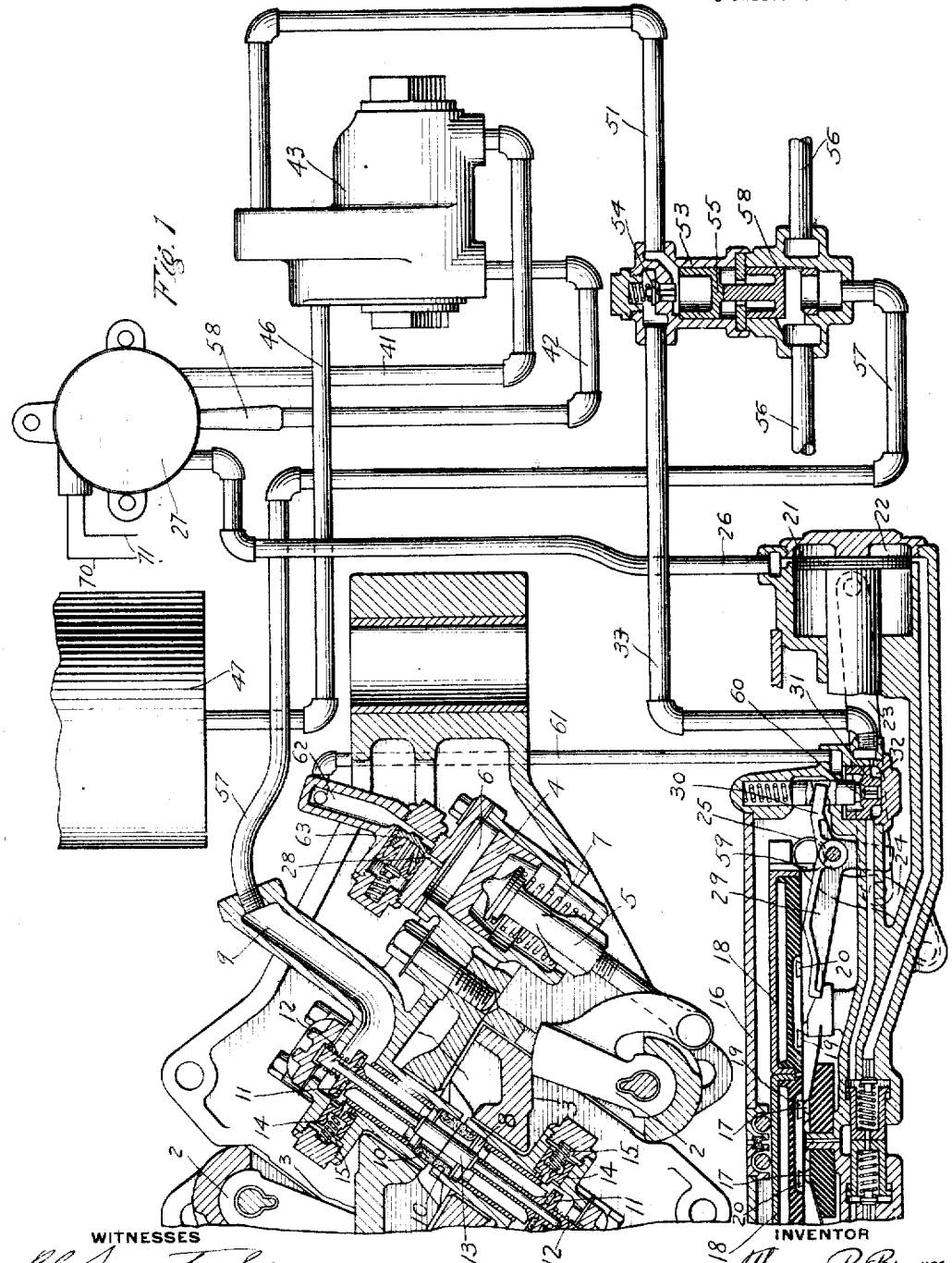

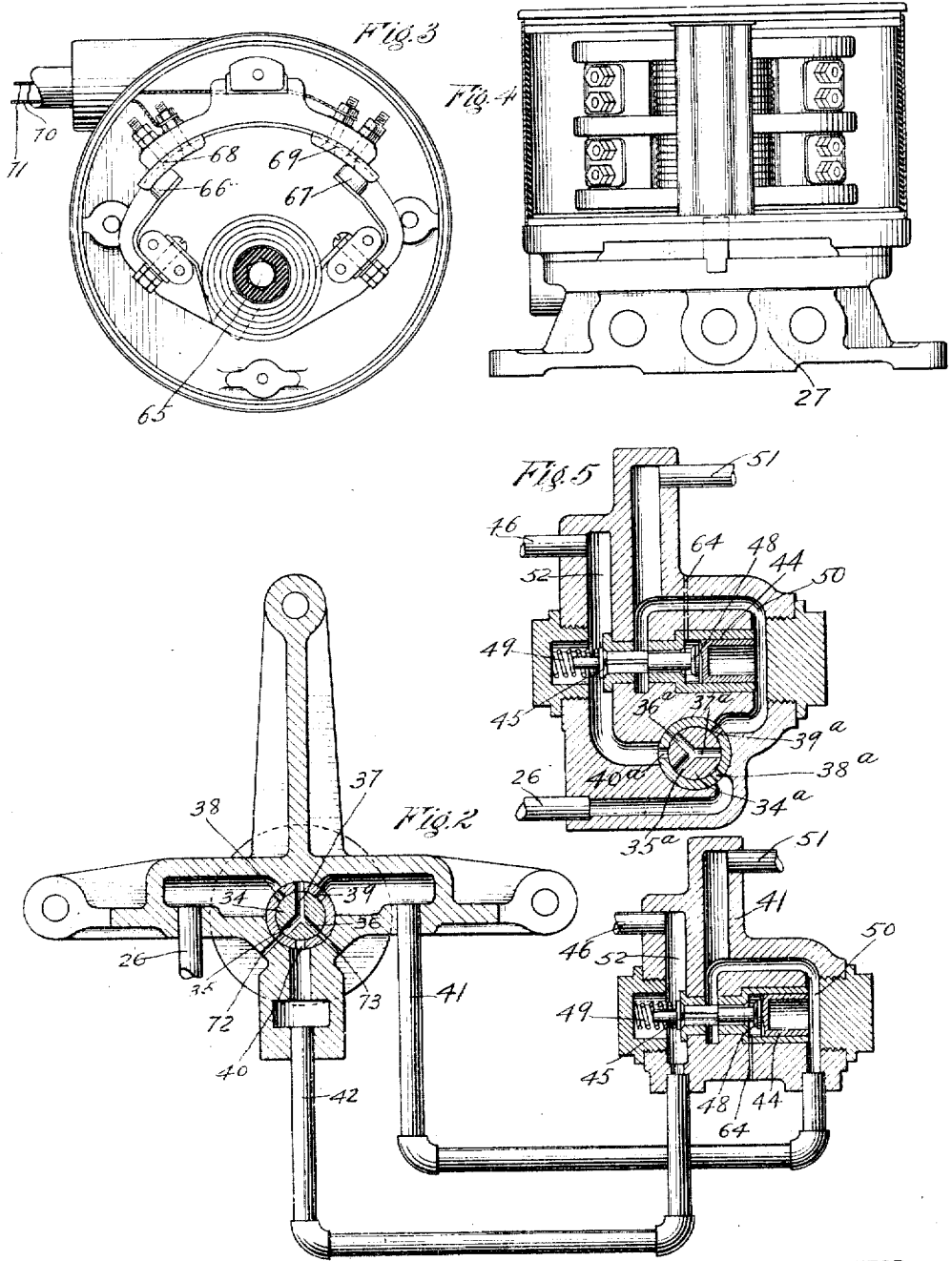

UNITED STATES PATENT OFFICE.

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

CAR AND ELECTRIC COUPLING CONTROL.

1,269,253.      Specification of Letters Patent.      Patented June 11, 1918.

Application filed April 10, 1914. Serial No. 830,998.

*To all whom it may concern:*

Be it known that I, THOMAS R. BROWN, a citizen of the United States, residing at Sparkill, in the county of Rockland and State of New York, have invented new and useful Improvements in Car and Electric Coupling Controls, of which the following is a specification.

This invention relates to coupling devices for railway cars and for connecting fluid pressure conduits and electric train line circuits, and more particularly to a control apparatus therefor.

One object of my invention is to provide an improved manually operated controlling mechanism for releasing the car couplers and for controlling the movements of electric train line couplings.

Another object of my invention is to provide a fluid pressure controlling mechanism for coupling devices of the above type having means for maintaining the fluid pressure supply for releasing the coupling devices when the controlling cock is turned to lap or neutral position.

When cars are uncoupled, it is often desired to hold the brakes applied on one section of the train while releasing the brakes on the other section. If, after applying the brakes, the brake pipe pressure is increased to release the brakes on one section of the train before uncoupling, the increased pressure will be communicated through the fluid pressure couplings to the other section, so that the brakes will be released on both sections.

In order to prevent the release of the brakes on one section when cars are to be parted, another object of my invention contemplates the provision of means for automatically closing the brake pipe communication to the couplings upon movement of the control mechanism to effect the release of the connected couplings.

In the accompanying drawings, Figure 1 is a diagrammatic view of coupling devices for cars, fluid pressure conduits, and electric train line circuits, with a control apparatus embodying my improvements applied thereto; Fig. 2 a sectional view of the valve mechanism employed for controlling the coupling devices; Fig. 3 a plan view of the electric switch portion of the controlling mechanism with the cover plate removed; Fig. 4 an elevational view of the combined electric switch and controlling valve, the switch casing being in section; Fig. 5 a central sectional view of a modified form of a fluid pressure controlling valve mechanism without the electric switch; Fig. 6, a diagrammatic sectional view of a portion of the electric coupling showing one of the train line circuits coupled and connected to the manually operated switch; and Fig. 7, a horizontal section of a portion of the contact carrier showing the releasing springs.

According to the construction illustrated in Fig. 1 of the drawings, the control mechanism is applied in connection with a combined car and fluid pressure coupling of the tight lock type having fluid pressure means for actuating the coupler locking lever as set forth in the pending application of James S. Doyle and Frank Hedley, Serial No. 756469, filed March 24, 1913.

The coupling has a hook-shaped projection with a vertical plane surface adapted to engage a similar surface of a counterpart coupling by a relative lateral movement and is held tightly locked by means of a pivoted locking lever 2 adapted to bear against a surface 3 on the outer side of the projection 1 of the counterpart coupling.

The locking lever 2 is operated by a piston 4 connected thereto by a rod 5 and contained in a piston chamber 6. A spring 7 acts on one side of the piston for normally holding the locking lever 2 in its locking position and the piston chamber 6 is provided with a port 28 through which fluid under pressure may be supplied to the piston 4 for releasing the locking lever.

One or more passages 8 are provided for connecting train pipe lines through the coupling, each passage 8 communicating with a pipe connection 9 and having at its terminus a suitable gasket 10 adapted to engage a corresponding gasket of a counterpart coupling head in the act of coupling.

The passages 8 are controlled by valves 11 having springs 12 tending to seat same and close communication through the passages and are provided with tappet stems 13 adapted to engage corresponding stems of a counterpart coupling for opening the valves when couplings are connected up.

Upon uncoupling intentionally, the valves 11 close automatically and prevent escape of fluid, but in order to provide for venting the brake pipe to the atmosphere upon accidental parting of the train, so as to secure an automatic application of the brakes, a fluid pressure controlled locking piston 14 is provided which is normally held in position for preventing the closing of the valve 11 by a spring 15. If, however, counterpart couplings are intentionally separated, fluid under pressure which is normally permitted to equalize the piston 14 from the train brake pipe side to the spring chamber side, is vented from said chamber in the act of releasing the coupler locking levers, so that the brake pipe pressure acts to retract the locking piston and permit the valves 11 to close when the cars part, all as described in the pending application hereinbefore mentioned.

The electric train line coupling shown in the drawings is of the type having a movable contact carrier adapted to be projected into a counterpart coupling for connecting the electric train line circuits and is similar to the construction set forth in my pending application, Serial No. 823970, filed March 11, 1914.

As shown, the electric train line coupling comprises a casing 16 containing a plurality of fixed contacts 17 connected to corresponding train line circuits, and a movable contact carrier 18 having connected contact bars 19 and 20 adapted upon projection of the carrier to electrically connect the fixed contacts 17 of counterpart couplings and thereby close the corresponding train line circuits between cars.

In this construction, the contact carrier 18 is operated by a piston 21 contained in a piston chamber 22 and connected by a pivoted link 23 with a lever 24 fulcrumed at a point on the casing 16 and provided with a roller 25 which engages with the contact carrier 18.

Fluid under pressure for operating the piston 21 is supplied to the piston chamber 22 through a pipe 26 leading to a controlling valve mechanism 27.

In order to lock the contact carrier 18 in its projected position, a trip lever 29 is provided which is adapted to engage the end of the carrier and thereby prevent return movement thereof.

The trip lever 29 carries a finger 30 which is operated by a piston 31 contained in a piston chamber 32. Fluid for operating the piston 31 is supplied to the piston chamber 32 through a pipe 33.

The controlling valve mechanism 27 preferably comprises, as shown in Fig. 2 of the drawings, a cock 34 having connected passages, 35, 36 and 37, for controlling ports 38, 39, and 40, the port 38 communicating with pipe 26, the port 39 with a pipe 41, and the port 40 with a pipe 42.

Pipes 41 and 42 lead to valve device 43 comprising a piston 44 adapted to operate a valve 45 controlling communication from a supply pipe 46 which may be connected to the main reservoir 47. The piston 44 also controls a valve 48, the valve 45 being normally held closed and the valve 48 open by a spring 49.

The pipe 41 leads to a passage 50 opening to one side of piston 44 and communicating with a pipe 51, and pipe 42 leads to a passage 52 open to the supply pipe 46.

Pipes 33 and 51 communicate through a valve device 53, containing a check valve 54 adapted to permit flow from pipe 51 to pipe 33 but preventing flow in the opposite direction.

The valve device 53 also contains a piston 55 subject on one side to the flow of fluid through pipe 51, and adapted to operate a valve 58 for controlling communication from the brake pipe 56 to pipe 57 which leads to the pipe connection 9 in the car and fluid coupling, the brake pipe 56 being connected to the usual brake valve on the car. (Not shown.)

In operation, after the car couplers are connected together in the usual way, the electric train line circuits may be closed by turning the handle 58ª of the cock 34 so that port 37 registers with port 38 and port 35 with port 40. Fluid under pressure is then supplied from the reservoir 47 through pipe 46, passage 52 to pipe 42, ports 40, 35, 37 and 38 to pipe 26 and thence to piston chamber 22. The piston 21 is thus actuated by fluid pressure and through the link 23 and lever 24 operates to project the contact carrier 18 into the counterpart coupling so as to connect the fixed contacts 17 of the counterpart coupling heads through the connected contact bars 19 and 20 and thereby close the electric train line circuits. In the projected position, the trip lever 29 engages back of the contact carrier and thereby prevents the return movement thereof.

When it is desired to uncouple, the handle 58ª is turned so that ports 37 and 36 of the cock register respectively with ports 39 and 40. Fluid under pressure is then supplied from pipe 42 through ports 40, 36, 37, and 39, to pipe 41 and thence flows through passage 50, pipe 51, past check valve 54 to pipe 33 and into piston chamber 32. The piston 31 is thus shifted so as to lift the finger 30 and thereby trip the lever 29, permitting the contact carrier 18 to return to normal position by the action of suitable springs 75, as shown more particularly in Fig. 7.

In the return movement of the contact carrier 18, a projection 59 on the carrier engages the lever 29 so as to depress same and thereby open a valve 60 seating in the piston 31. This permits fluid to flow from pipe 33 and piston chamber 32 to a pipe 61 leading to passage 62 in the car coupler. Fluid pressure thereupon acts on piston 63 to shift the same and open port 28, so that fluid is supplied to piston 4, the movement of which operates to shift the locking lever 2 to release position, so that the counterpart couplings may be separated.

When fluid is supplied to the pipe 51 for releasing the coupling devices, the same acts on the piston 55 of the valve device 53 and operates to close the valve 58. Thus the brake pipe on that car is cut off from the pipe coupling connection, so that the brake pipe pressure may be increased to release the brakes on this car without affecting the brake pipe pressure on other cars.

The pressure of fluid flowing through passage 50 in the valve device 43 acts on piston 44, operating the same to close the valve 48 and open the valve 45. This permits direct flow of fluid from the supply pipe 46 to the pipe 51 and since the closing of valve 48 reduces the area of piston 44 which is exposed to fluid pressure on that side, the action of fluid pressure on the greater exposed area of the opposite side of the piston operates to maintain the piston in the position for holding the valve 45 open. Consequently the cock 34 may be returned to normal position without causing an interruption of the supply of fluid for releasing, since flow continues through the open valve 45.

In order to maintain the unexposed area of piston 44 at atmospheric pressure, a small port 64 leads from the valve chamber of the valve 48 to the atmosphere.

In operating the electric train line couplings, it is highly desirable that certain circuits, such as the governor circuit for instance, should be opened before uncoupling, since otherwise, with current flowing, destructive arcs are liable to be formed when the coupling contacts are separated.

In order to avoid this, one feature of my invention consists in providing a switch adapted to be controlled by the movement of the coupling controlling valve mechanism, so that normally in the neutral position said circuits are closed, but upon movement of the controlling valve handle in either direction from the neutral position said circuits are opened.

Accordingly, I preferably provide an extension on the stem 65 which operates the valve 34 and on said extension are carried contacts 66 and 67. In the neutral position, said contacts engage fixed contact 68 and 69 which are connected to leads 70 and 71 forming part of a circuit through which current is supplied for said train line circuit.

It will now be evident that if the controlling valve handle 58ª is turned in either direction from the neutral position to effect the coupling or uncoupling of cars, as the case may be, the said circuit will be opened and consequently the flow of current will be cut off in said train line circuit, thus preventing arcing and consequent damage to the coupling contacts. Vent ports 72 and 73 may be provided in the controlling valve for registering with ports 35 and 36 in the cock 34 when in neutral position, so that any leakage of fluid around the cock in this position will be vented to the atmosphere.

In Fig. 5 of the drawings is shown a controlling valve mechanism similar to that hereinbefore described, but omitting the circuit controlling or switch portion, and showing the controlling cock incorporated in the same casting. The operation is the same as that of the construction previously described, the same having a normal closed position and one position in which fluid is supplied through ports, 40ª, 36ª, 37ª, 39ª, and 50, to pipe, 51, for uncoupling and another position in which fluid is supplied through ports, 40ª, 35ª, 37ª, 38ª, to pipe, 26, for projecting the contact carrier of the electric train line coupling.

Having now described my invention, what I claim as new and desire to secure by Letters Patent, is:—

1. The combination with a coupling provided with a movable lock for holding counterpart couplings clamped together, and an electric train line coupling having a movable contact carrier adapted to be projected for closing the train line circuits, means for holding the contact carrier in the projected position, and fluid pressure means for releasing the coupling lock and the contact carrier holding means, of a manually operated valve for supplying fluid for releasing the couplings, and means for maintaining the flow of fluid after closing the manually operated valve.

2. The combination of a coupling provided with a movable lock for holding counterpart couplings clamped together, an electric train line coupling having a movable contact carrier adapted to be projected for closing the train line circuits, fluid pressure means for releasing the carrier and the coupler lock, a manually operated valve for controlling the supply of fluid to said means and a valve operated by the flow of fluid to said means for opening a direct communication for supplying fluid thereto.

3. The combination of a coupling provided with a movable lock for holding counterpart couplings clamped together, an electric train line coupling having a movable contact carrier adapted to be projected for closing the train line circuits, fluid pressure means for releasing the carrier and the coupler lock, a manually operated valve for supplying fluid to said means, a valve controlling a direct connection for supplying fluid thereto, and a piston operated by the flow of fluid to said means for opening said valve.

4. The combination with an electric train line coupling having a movable contact carrier adapted to be projected for connecting the electric train line circuits, pressure means for locking said carrier in its projected position and a fluid pressure device for releasing said lock, of a manually operated valve for supplying fluid to said device, and a valve device operated by fluid pressure supplied to said means for opening a direct connection for supplying fluid thereto.

5. The combination of a coupling having a train brake pipe passage with an opening adapted to register with a corresponding opening in a counterpart coupling, a movable lock for holding counterpart couplings clamped together, an electric train line coupling having a movable contact carrier adapted to be projected for closing the train line circuits, fluid pressure means for releasing the carrier and the coupler lock, a manually operated valve for supplying fluid to said means, and a valve device operated by the flow of fluid to said means for closing communication through said brake pipe passage.

6. The combination with an electric train line coupling and fluid pressure means for operating said coupling, of a manually actuated valve for controlling the fluid pressure for operating said coupling and an electric switch operable with said valve for controlling a circuit supplying current for the electric train lines.

7. The combination with an electric train line coupling having a contact carrier adapted to be projected for closing the train line circuits and fluid pressure actuated means for operating said carrier, of a valve for supplying operating fluid to said means, a handle for actuating said valve, and an electric switch operated by said handle for controlling the current in said train line circuits.

8. The combination with an electric train line coupling having a contact carrier adapted to be projected for closing the train line circuits and fluid pressure actuated means for operating said carrier, of a valve for supplying fluid to said means, and an electric switch operated upon movement of said valve for opening a circuit through which electric current is supplied to the train line circuits.

9. The combination with an electric train line coupling having a plurality of fixed contacts and a movable contact carrier having contacts and adapted to be projected for electrically connecting the fixed contacts of counterpart couplings, of fluid operated means for effecting the release of the contact carrier to open the train line circuits, a manually operated valve for supplying fluid to said means and an electric switch normally closing a circuit through which current is supplied to said train line circuits and operated upon movement of said valve to open said supply circuit.

In testimony whereof I have hereunto set my hand.

THOMAS R. BROWN.

Witnesses:
S. W. KEEFER,
S. A. MALONE.